United States Patent Office 3,307,706
Patented Mar. 7, 1967

3,307,706
MILK FILTERS
Philip S. Taylor, Walpole, Mass., assignor to The Kendall Company, Boston, Mass., a corporation of Massachusetts
No Drawing. Filed Dec. 13, 1963, Ser. No. 330,239
2 Claims. (Cl. 210—504)

This invention relates to fibrous filter media used for the filtration of fluids containing fine sediment. More particularly it relates to an improved fiber blend to be used in such media whereby the efficiency of the medium in removing fine sediment is improved without decreasing the speed of filtration.

In the processing of aqueous fluids, particularly such fluids as milk and other dairy products, it is customary to perform a preliminary filtration operation close to the source of production, to remove as much as possible of the solid impurities which may serve to contaminate the milk by introducing bacteria. This is in many cases done at the dairy farm, raw milk as it is produced being filtered through a fibrous pad mounted in a strainer, before the milk is collected in a bulk cooling tank.

The sediment or impurities removed by this process include coarse material such as hair, straw, shavings, etc., down to very finely divided dirt or soil, which varies in amount and in degree of subdivision with the weather and the season. It is customary for milk collected at the farm to be periodically tested for sediment by an inspector or sanitarian, and unless an efficient filtration has been performed, the milk producer is liable to suffer an economic penalty. Efficient removal of fine sediment, therefore, is desirable both for sanitary and economic reasons. Such removal, however, must be effected without unduly prolonging the time required to filter a given quantity of milk.

Commercial milk filter disks

Although a limited number of filter pads or disks are still produced from a napped fabric such as flannel, most of such disks now in use consist of a pad of intimately intermingled unspun and unwoven textile-length fibers. The fibrous pad is generally bonded, to impart wet strength, in one of two ways. A fibrous fleece, comprising for example a series of superimposed card webs, may be lightly bonded on both surfaces, so that 10% to 20% of the fibers constituting the surfaces are unified into a firm, wash-resistant sheet, the two surface sheets being separated by a thicker layer of fibers containing no binding agent. Disks cut from such a fibrous array are known as "surface bonded," and an unweighted stack of 100 of such disks commonly measures about 6 inches in height. Surface-bonded disks of this type are considered as "low density" disks.

Alternatively, a fibrous fleece of similar weight and composition may be thoroughly impregnated with an excess of bonding agent, squeezed or vacuum-extracted to a controlled binder content, and dried. Neglecting migration, the binder is distributed throughout the breadth and depth of the bonded fleece, and a stack of 100 of such disks, as purchased commercially, will measure 2 inches or so in height. It is with "high density" disks of this type that the present invention is concerned. Either the surface bonded or the impregnated filter disks may be reinforced on one or both faces with a lightweight, open-meshed gauze adhesively united to the fibrous layer during the process of manufacture.

The processing conditions in the case of impregnated disks are more severe than in the case of the surface-bonded disk. In the latter, the main bulk of the fibrous fleece is retained in a loose, fluffy carded condition, and since the bonding material is merely "licked on" to the surface layers by means of spaced rollers, spraying or the like, the main fibrous mass of the disk is subjected only to a transient and minimal pressure. In the impregnated disk, the whole fibrous mass is saturated, squeezed, and otherwise processed to create a much more dense and highly compacted product. It is to improvements in the preparation of such compacted and impregnated filter disks that this invention relates, and such disks will be referred to herein as "high density" disks to distinguish them from the fluffy, surface-bonded type of product.

Nature of the invention

Commercial milk filter disks are commonly made of cellulosic fibers: that is, of bleached cotton, rayon, or mixtures thereof. Such fibers are hydrophilic, being readily wet by water or aqueous fluids, of which they absorb substantial amounts. Additionally, such fibers swell in water, the volumetric swelling of both cotton and rayon being in the neighborhood of 50% or higher. The modulus of rigidity of such fibers is low when they are wet, and the combination of these factors tends to produce a filter disk which collapses in use, with a consequent slowing-down of the filtration process. Attempts have been made to circumvent this slowing-down by the use of naturally wiry and resilient cotton fibers, as in U.S. Patent 2,433,531, and by the use of coarse or highly crimped rayon fibers disposed in stratified arrangement with other fibers, as in U.S. Patents 2,288,426 and 2,834,730. Although such expedients may effect an improvement in surface-bonded or low density filter disks, the use of such low wet modulus fibers does not result in a high density disk of improved properties, due presumably to the inability of the fibers to maintain their resilient condition under drastic wet processing conditions.

I have found, however, that the sediment-removal ability of high-density filter disks preponderantly composed of conventional cellulosic fibers can be substantially improved by intimately blending with the cellulosic fibers between 5% and 35% of other fibers having a wet stiffness of at least 8 grams per denier at elongations of between 1% and 10%, a volumetric swelling in water of less than about 3%, and in which the product of the fiber denier multiplied by the fiber stiffness is at least 40. By "intimatley blending" I mean that both species of fibers are intermingled throughout the length, breadth, and thickness of the filter sheet, and are not stratified in layers of different composition. The theoretical considerations dictating such a choice of fiber are set forth immediately below.

Selection of fiber blend

As a general rule, the finer the fibers in a filter disk, the more efficiently will the disk remove fine sediment. As a practical matter, however, milk filter disks composed solely of fine denier rayon, of say 1.5 denier, are not commercially acceptable because their speed of filtration is not only initially too slow, but the sediment tends to build up on the surface of the disk, and the filter becomes blocked, with no fluid passing therethrough. This is an intolerable situation on a farm where the speed of filtration of milk must roughly keep pace with the milk production at milking time. Although the filtering ability of a disk of fine rayon fibers is desirable, prior to my invention it has not been possible to use a preponderance of fine denier rayon fibers in a high density filter disk without the danger of unacceptably slow filtration rates.

I have found that it is possible to produce a high efficiency high density filter sheet, composed predominantly of fine rayon fibers of 1.5, 1.25, or even 1.0 denier, by blending intimately with the fine denier rayon fibers between 5% and 35% of a resilient, tough fiber of high wet stiffness, preferably a fiber of at least 5 denier and formed from a synthetic organic polymer such as a polyamide, polyester, polyolefin, or polyacrylate.

By an organic polymeric fiber of high wet stiffness I mean those fibers which have a stiffness of at least about 8 grams per denier when wet with water, under an elongation of from 1% to 10%. The ability to maintain a lofty, porous structure during the pressures encountered in the wet processing of a filter material is, I have found, more closely related to wet stiffness under 1% to 10% elongation than to the behavior of the fiber when dry. The following table shows the wet stiffness at 1% and 10% elongation of fibers which I have found useful in the practice of this invention.

TABLE 1

| | Elongation | |
|---|---|---|
| | 1% | 10% |
| Grams per denier: | | |
| Polyester | 28 | 12 |
| Polyamide | 8 | 8 |
| Polypropylene | 40 | 11 |
| Polyacrylate | 47 | 13 |

Such fibers are in contrast to fibers such as rayon (4 grams per denier at 1% elongation). The high wet stiffness fibers are generally characterized by a large area under the stress-strain curve, indicating a high index of toughness—that is, an ability to absorb the compressive forces encountered in the over-all staturation of high-density filter sheets while still retaining the ability to recover from such compression and to maintain a porous, non-compacting structure capable of efficient performance as a filter.

Although the wet stiffness is an index of fiber selection useful in this invention, the absolute value of stiffness will depend on the diameter of the fiber, which for any given fiber substance will vary with the fiber denier. That is, thicker or higher denier fibers of any given substance will have a higher absolute resistance to compression. I have found that as a general rule, most satisfactory results are obtained if the wet stiffness and the thickness of the organic polymeric fiber are such that the product of stiffness at elongations of between 1% and 10% multiplied by denier is at least about 40: that is, a fiber with a stiffness of 8 grams per denier should be used in a 5 denier size in order to function efficiently.

It is, of course, possible to select a fiber with a low stiffness but of such a high denier that the product of the stiffness by the denier is equal to 40. Such would be the case if 10 denier viscose fibers, with a stiffness of 4 grams per denier, were used. It has been my experience, however, that such coarse viscose fibers are not suitable for the practice of this invention. Such fibers are very hydrophilic: they swell readily in water and become very soft, so that they are readily and irrecoverably distorted and matted down during the process of being saturated with binder. The resultant filter sheet is very thin and dense, and is incapable of sustained efficient filtration of fine sediment without rapidly becoming blocked and impervious to aqueous fluids. This compacting tendency is characteristic of hydrophilic fibers which display a substantial tendency to swell in water, as marked by their known volumetric swelling indices, reportedly in excess of 10% and as high as 50%. Viscose, cotton and acetate fibers are representative of the fibers I have found not to give a satisfactory milk filter, even when used in coarse deniers.

As an additional limitation in the selection of fibers useful in this invention, therefore, they must be chosen from that class of fibers which are generally hydrophobic, not in the sense of being unwettable, but hydrophobic in the sense that they absorb little or no water into the fiber substance and are not swollen by water to any appreciable extent. A convenient quantitative limitation is to confine the choice of fibers useful in this invention to those which have a volumetric swelling index in water of less than about 3%.

It is possible by proper treatment to impregnate fibers such as cotton or rayon with resins which, when dried and cured on the fibers, in appropriate amount, will impart to the fibers a greatly enhanced wet stiffness and resistance to swelling in water. Such fibers are suitable for the practise of this invention provided that their wet stiffness is at least about 8 grams per denier at elongations of between 1% and 10%, and that they have a volumetric swelling index in water of not over 3% Such impregnated fibers are regarded as synthetic fibers for the purposes of this invention, since their properties when wet place them with the fibers derived from strictly synthetic polymeric material, rather than with cellulosic fibers.

It is also preferable that the resilient, non-hydrophilic fibers of the product of this invention be crimped, as an aid to the maintenance of a lofty, porous structure. Regular commercial crimped fibers of between 10 and 20 crimps or bends per inch of fiber length have been found satisfactory.

*Test method*

In testing filter media for filtration efficiency, it is desirable to use a reproducible laboratory test, since the amount and fineness of natural sediment encountered in actual farm filtration will vary widely from day to day. For this purpose I use a finely divided silicon carbide, Crystalon, in a fineness of 280 mesh, which has an average particle size of about 48 microns.

Five grams of this silicon carbide are suspended in 5 gallons of water and filtered through a wet-out disk mounted in a conventional metal milk strainer. The time necessary to complete the five gallon filtration is recorded, after which the filter disk, containing retained sediment, is dried and ignited in a muffle furnace. The amount of silicon carbide after ignition, divided by 5, is the percent sediment retained, and is expressed as percent efficiency of sediment removal.

A five gallon filtration of this type is representative of an actual farm filtration, where 5 to 10 gallons of milk are customarily filtered through a single disk. The test has been found to correlate well with standard farm sediment tests, wherein a sample of milk is force-filtered through a small compacted sediment-test disk and the appearance of the sediment-test disk is used as a criterion of the clarity of the milk.

*Preparation of high-density filter sheets*

The desired proportions of fibers of different species are blended intimately and passed through a set of carding machines or the like. To attain the desired weight of about 63 grams of fiber per square yard, the output webs from 5 or 6 cards are superimposed and are continuously transported to a conventional saturator, where the composite fleece is saturated with a suitable binding agent. The binding agent is preferably one which may be dispersed or dissolved in water, but which on drying or curing becomes relatively insensitive to water, so that the integrity of the fibrous array is not disturbed during a subsequent filtration. Polyvinyl acetate emulsions containing a cross-linking agent are suitable, as are starch ethers and esters, and modified starches of high amylose content. This latter binding agent must be solubilized by heating with water under pressure, but after drying forms a film which is less water sensitive than film from regular starch.

The saturated fleece is then squeezed or vacuum-extracted to control the amount of binder added in the saturation step. It is in this operation that the wet resilience of the fibers blend must be sufficient to overcome the tendency of the fibers to deform permanently into an excessively compact and dense structure which will block or plug up in subsequent filtering operations. The influence of the fibrous blends useful in the practice of the present invention is set forth below.

A conventional drying operation, as by passing the saturated fleece over a set of dry cans, may be followed by a heat-curing operation if the particular binder formulation requires such a step.

EXAMPLE 1

An intimate blend of 67% dull crimped 3 denier viscose rayon and 33% dull crimped 1.5 denier viscose rayon was processed into a bonded filter sheet according to the procedure set forth in the preceding section. The dry fibrous web weighed 54 grams per square yard, and was saturated with 20% of a binder comprising Polyco 117-H, a polyvinyl acetate emulsion, plus a minor amount of melamine-formaldehyde resin to assist in the insolubilization of the polyvinyl acetate. When disks cut from this sheet were tested for sediment retention and speed, a retention of 50% and a flow time of 35 seconds for 5 gallons of sediment-laden fluid were noted.

When the filter sheet was composed entirely of 3 denier rayon, the filter disks maintained or improved their flow time, but the efficiency of sediment removal decreased to the point where it was apparent that the filter would be unsatisfactory in actual farm use. The same generalization may be made about the use of rayon fibers of coarser denser, filtration efficiency decreasing as the fiber denier decreases. For maximum efficiency, I prefer that the fiber blend shall consist of at last 65% fine rayon fibers, of 1.5 denier or lower. On the other hand, a filter disk composed entirely of 1.5 denier or lower viscose fibers will filter milk for only a short time before becoming impervious, which results in stoppage of filtration and unacceptable performance.

EXAMPLE 2

An intimate blend of 75% 1.5 denier dull crimped rayon and 25% of a polyester fiber known as Fiberfill, averaging 5 denier, was processed into a filter sheet according to the procedure of Example 1. The weight of the finished sheet was 66 grams per square yard, and the thickness was 0.041 inch, which indicated an apparent density of 0.076 gram per cubic centimeter. By contrast, the true density of a void-free mixture of 75% rayon-25% polyester fiber would be 1.50 grams per cubic centimeter.

When tested according to the standard test procedure set forth above, a satisfactory flow time of 35 seconds was recorded, but in contrast to Example 1, the efficiency of sediment removal increased to 75%, an increase of 50% more sediment retained than was retained by the disk of Example 1.

When the example was repeated with an 85%–15% blend of 1.5 denier viscose and polyester fiber, the same flow time of 35 seconds was realized, with a sediment removal efficiency of 80%. A 90%–10% vicsose-polyester blend again had a flow time of 35 seconds, with an efficiency of 74%.

EXAMPLE 3

The procedure of Example 1 was applied to a fibrous web consisting of a mixture of 75% 1.25 denier crimped rayon fibers and 25% 6 denier crimped bright nylon fibers. The flow time of the resulting disk was 31 seconds, and the sediment retention was 71%, when tested as outlined above. The disk was .042 inch thick and weighed 69 grams per square yard, indicating an apparent density of .078 gram per cubic centimeter.

EXAMPLE 4

The procedure of Example 1 was applied to a fibrous web consisting of a mixture of 85% 1.25 denier crimped rayon and 15% 15 denier crimped bright nylon. The flow time of the resulting disk was 32 seconds, and the sediment retention was 70%, when tested as outlined above. The disk was .042 inch thick and weighed 64 grams per square yard, indicating an apparent density of .072 gram per cubic centimeter.

Having thus described my invention, I claim:

1. An impregnated and bonded non-woven filter sheet material of intimately intermingled textile-length fibers consisting essentially of between 65% and 95% of, viscose rayon fibers of denier not greater than about 1.5, and having a volumetric swelling index in water of greater than 10%, and between 35% to 5% of crimped synthetic fibers, said fibers having a wet stiffness of at least 8 grams per denier at elongations of between 1% and 10%, a volumetric swelling index in water of less than 3%, and in which the product of wet stiffness times fiber denier is not less than about 40, said filter sheet being of substantially uniform composition throughout its depth and being bonded substantially throughout its depth.

2. The product according to claim 1 in which the crimped fibers are chosen from the group consisting of synthetic polyamide, polyester, polyolefin, and polyacrylic fibers.

References Cited by the Examiner

UNITED STATES PATENTS

| | | | |
|---|---|---|---|
| 2,336,797 | 12/1943 | Maxwell | 210—504 X |
| 2,834,730 | 5/1958 | Painter et al. | 210—504 |

FOREIGN PATENTS

| | | |
|---|---|---|
| 467,216 | 8/1950 | Canada. |
| 644,579 | 7/1962 | Canada. |
| 752,287 | 7/1956 | Great Britain. |

LEON D. ROSDOL, *Primary Examiner.*

A. T. MEYERS, M. WEINBLATT, *Assistant Examiners.*